United States Patent
Junker (10) Patent No.: US 10,293,450 B2
(45) Date of Patent: May 21, 2019

(54) STEADY REST FOR SUPPORTING CENTRAL WORKPIECE REGIONS DURING THE MACHINING OF CENTRAL AND/OR ECCENTRIC WORKPIECE REGIONS, IN PARTICULAR BEARING POINTS ON CRANKSHAFTS, AND GRINDING MACHINE HAVING SUCH A STEADY REST

(71) Applicant: Erwin Junker Maschinenfabrik GmbH, Nordrach (DE)

(72) Inventor: Erwin Junker, Buehl/Baden (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 86 days.

(21) Appl. No.: 15/100,462

(22) PCT Filed: Oct. 9, 2014

(86) PCT No.: PCT/EP2014/071650
§ 371 (c)(1),
(2) Date: May 31, 2016

(87) PCT Pub. No.: WO2015/086190
PCT Pub. Date: Jun. 18, 2015

(65) Prior Publication Data
US 2016/0297046 A1    Oct. 13, 2016

(30) Foreign Application Priority Data
Dec. 9, 2013    (DE) .................. 10 2013 225 292

(51) Int. Cl.
*B24B 5/42*    (2006.01)
*B24B 49/04*    (2006.01)
(Continued)

(52) U.S. Cl.
CPC .............. *B24B 5/421* (2013.01); *B23Q 17/20* (2013.01); *B24B 41/065* (2013.01); *B24B 49/04* (2013.01)

(58) Field of Classification Search
CPC ....... B23Q 17/20; B24B 41/065; B24B 49/04; B24B 5/421
See application file for complete search history.

(56) References Cited

U.S. PATENT DOCUMENTS 5,486,130 A * 1/1996 Kilmer, Sr. .............. B23Q 7/04
                                                    451/11
8,360,819 B2 * 1/2013 Junker ..................... B24B 5/12
                                                    451/11
(Continued)

FOREIGN PATENT DOCUMENTS

DE          3734734 A1      4/1989
DE          4410387 A1 *    9/1995    .............. B23Q 1/76
(Continued)

OTHER PUBLICATIONS

DE 102011015205 B3 Jul. 2012 English Machine Translation.*
International Search Report for PCT/EP2014/071650, dated Jan. 12, 2015.

*Primary Examiner* — Marc Carlson
(74) *Attorney, Agent, or Firm* — Marshall, Gerstein & Borun LLP (57) ABSTRACT

A steady rest for supporting, e.g., bearing points on shaft parts of crankshafts, during the grinding of central and/or eccentric workpiece regions. For the grinding, the steady rest is brought from a retracted position to a supporting position against the workpiece region to support the workpiece region at respective circumferential regions. The supporting parts are each arranged on a lateral flank of a prism opening in a fork-like manner on a steady-rest arm in a fixed position in relation to each other and to the steady-rest arm, (Continued)

the supporting parts thus forming an opening angle to each other. The supporting parts are arranged below center with respect to the longitudinal axis of the workpiece region such that an angle bisector between the two supporting parts has a fixed acute angle to the vertical extending through the longitudinal axis of the workpiece region and the CNC-controlled advancement occurs along said angle bisector. The invention relates to a grinding machine, which has a steady rest described above.

23 Claims, 8 Drawing Sheets

(51) Int. Cl.
*B24B 41/06* (2012.01)
*B23Q 17/20* (2006.01)

(56) References Cited

U.S. PATENT DOCUMENTS

| | | | |
|---|---|---|---|
| 2003/0060133 A1* | 3/2003 | Junker | B24B 3/247 |
| | | | 451/28 |
| 2007/0178808 A1* | 8/2007 | Himmelsbach | B24B 19/12 |
| | | | 451/11 |
| 2010/0048104 A1* | 2/2010 | Junker | B24B 5/12 |
| | | | 451/49 |
| 2011/0003534 A1* | 1/2011 | Himmelsbach | B24B 5/42 |
| | | | 451/5 |

FOREIGN PATENT DOCUMENTS

| | | | | |
|---|---|---|---|---|
| DE | 19962796 A1 | | 7/2001 | |
| DE | 102009051737 B3 | * | 10/2010 | B24B 1/00 |
| DE | 102011015205 B3 | * | 7/2012 | B23Q 1/25 |
| DE | 102011015205 B3 | | 7/2012 | |
| GB | 1000271 A | * | 8/1965 | B24B 5/421 |
| GB | 1000271 A | | 8/1965 | |
| WO | WO-9803303 A1 | | 1/1998 | |
| WO | WO-2008104571 A1 | | 9/2008 | |

* cited by examiner

STEADY REST FOR SUPPORTING CENTRAL WORKPIECE REGIONS DURING THE MACHINING OF CENTRAL AND/OR ECCENTRIC WORKPIECE REGIONS, IN PARTICULAR BEARING POINTS ON CRANKSHAFTS, AND GRINDING MACHINE HAVING SUCH A STEADY REST

CROSS-REFERENCE TO RELATED APPLICATIONS

This is the United States National Stage of International Patent Application No. PCT/EP2014/071650, filed Oct. 9, 2014, which claims the priority benefit of DE 102013225292.7, filed Dec. 9, 2013, the entirety of which are incorporated by reference herein.

TECHNICAL FIELD

The invention concerns a steady rest for supporting central workpiece regions during the machining of central and/or eccentric workpiece regions, in particular on shaft parts of, in particular, crankshafts, which steady rest is placed on the bearing points during the grinding operation. The invention also concerns a grinding machine with such a steady rest.

BACKGROUND

Steady rests for supporting central workpiece regions during the machining of central and/or eccentric workpiece regions, in particular bearing points on, in particular, crankshafts, are known. These steady rests serve the purpose of additionally supporting so-called relatively soft workpieces, such as crankshafts, while they are being ground, so that the application of the grinding forces leads, if possible, to no deformation of the workpiece that is to be ground or at least causes only a minor deformation to occur.

Steady rests from the AROBOTECH Company, which are preferably used for shaft diameters or main bearing diameters of crankshafts of, for example, up to 70-80 mm, are often used on grinding machines for grinding crankshafts. In the case of larger shaft parts or crankshafts, for which steady rests must be used for grinding, the known steady rests are disadvantageous insofar as they usually require a large space. Because of their design, these known steady rests with their steady rest jaws must be retracted when the workpieces are loaded and unloaded. These known steady rests usually have three jaws, which usually have a PCD (polycrystalline diamond) coating or CBN (cubic boron nitride) coating. By way of this design, the respective bearing point that is to be supported is firmly "clamped" by three jaws, with the bearing points being supported between the PCD-coated supporting elements in a diameter range greater than 180°, e.g., about 210°. The workpiece is "clamped" in a self-centering way and the advance of the jaws takes place toward the workpiece center, i.e., centrically with respect to the bearing diameter. The motions of the individual steady rest jaws are permanently mechanically coupled, which leads to a relatively complicated mechanical system. The "clamping" at three fixed points requires a previously well pre-machined bearing point for placement of the steady rest. It is therefore difficult to adjust the steady rest for the aforesaid reasons. The permanent mechanical coupling of the three jaws of the known steady rest requires relatively big forces to be transferred when it is put in place, which leads to pronounced track marks at the bearing point that is to be supported. It is, in particular, known that so-called two-point steady rests should be used for workpieces having larger diameters, with the two independently adjustable, possibly PCD-coated supports supporting the workpiece being respectively adjusted by means of separate CNC shafts. The use of two separate CNC shafts increases the construction complexity of such steady rests and thus their costs, which is why such steady rests are technically very complex and very expensive. The two support points and/or regions of such known steady rests are usually positioned at right angles to each other, with one support point and/or region being positioned at the bearing point from below and the other support point and/or region opposite the grinding wheel and being placed against the bearing point.

Steady rests where the two bearing points are arranged in a positively controlled way as in U.S. Pat. No. 6,257,972 B1, with support being provided by a third, opposite beating point, are also known. The individual steady rest supporting components are either set by means of stops or are installed at a fully polished bearing point. No adjustment of the steady rest when the steady rest position is ground is or can be provided for.

A two-point steady rest with two fixed, mutually opposite supporting parts is moreover known from DE 10 2011 015 205 B3. This known steady rest for supporting a workpiece horizontally and vertically has two supports disposed at a lateral distance from each other that are adjustable with respect to the workpiece, with a conveyor that is loosely guided by a base carrying the supports and the conveyor being displaceable in a radial direction with respect to the workpiece, so that both supports can be jointly delivered to the workpiece. The radial displacement of the conveyor takes place against the effect of a spring, so that an additional movable member is present between the workpiece that is to be supported and the actual steady rest supporting base. The maximum attainable concentricity is therefore on the order of a few μm.

GENERAL DESCRIPTION

It is therefore the object of the present invention to disclose a steady rest and a grinding machine by means of which concentricity errors in central workpiece regions can be improved down to less than 1 μm.

Such highly exact concentric grinding results are achieved by means of a steady rest having characteristics in accordance with Claim 1 and/or by means of a grinding machine having the characteristics in accordance with Claim 13. Additional embodiments are defined in the respective dependent claims.

The use of the term "central bearing point" shall hereinafter be understood and intended for those workpieces that are of a centric design, but that are not necessarily a bearing point on the workpiece and/or the shaft part. The word "workpiece" is likewise also understood to signify a workpiece that has a central workpiece region.

A steady rest according to this invention provided for purposes of supporting central bearing points during the machining of central or eccentric bearing points on shaft parts, which is, in operating conditions, brought from a retracted position to a supporting position at a bearing point of the shaft part, particularly a crankshaft, when it is being ground, is designed so that at least two supporting parts that can be advanced to the bearing point are provided. These supporting parts are the actual supporting components and they support the bearing point that is to be ground at respective peripheral regions that are spaced apart from each other, with the distance between regions being defined by the distance between the supporting parts. The forward part of the steady rest is configured as a prism, which supports the shaft part at the bearing point where it is to be supported in the supporting position in a fork-like manner. The prism has two limbs of a steady rest arm forming the fork, each of which carries a support, with each of the supports facing a side of the respective limb, thus forming an opening angle. The position of the supports with respect to each other and to the steady rest arm is fixed. This means that the locations of the supporting parts with respect to each other are fixed. Moreover, the steady rest with its upward-pointing prism in its supporting position is sub-centrically aligned with regard to the longitudinal axis of the steady rest, with the bisector formed between the two supporting parts through the attachment at the limbs of the steady rest arm forming a fixed acute angle to a vertical line passing through the longitudinal axis of the bearing point. The steady rest has a so-called CNC shaft that enables a controlled infeed of the steady rest along the bisector against the bearing point to an extent such that the steady rest is in its supporting position and such that it receives and supports the shaft part that is to be ground in that position.

The fixed arrangement of the supports with respect to each other at the lateral flanks of the prism of the steady rest, in conjunction with the sub-center reception of the shaft part that is to be ground for purposes of support via the bisectors through the longitudinal axis of the bearing point makes it possible for the supporting region of the steady rest to sub-centrically lie below a plane formed by the rotational axis of the grinding wheel and the central longitudinal axis of the workpiece, i.e., below the center of the workpiece. This is advantageous in grinding operations because the bearing point that is to be supported is never exactly round, and because the support position and the design of the steady rest of this invention prevents the normally existing concentricity errors from being continually reproduced and/or copied onto the bearing point that is to be ground. If the supporting points of two supports are positioned exactly opposite the grinding point—as in the prior art—, the eccentricities are indeed reproduced during the grinding of the bearing points, which means that the shapes and magnitude of the eccentricities are not only reproduced during the grinding process but can also be enhanced.

A more careful support of the respective bearing point is achieved in the case of the steady rest of this invention, because a controlled placement against the bearing point is made possible by way of the steady rest's separate CNC shaft, namely such that the bisector between the two supports always passes through the central longitudinal axis and/or the rotational axis of the bearing point. And this also leads to a decrease of the wear tracks by the steady rest at the point of support.

The entire prism-like support of the steady rest of this invention has a selected prismatic angle, i.e., the angle of the lateral flanks of the steady rest arm of the prism with respect to each other, in which the bearing point is taken up and supported in the manner of a fork. A respectively used steady rest can have a different angle of the supporting prism, depending on the shape and size of the shaft part that is to be supported and according to the technical requirements. It is generally also advantageously possible for the legs of the prism of the steady rest arm to be adjustable in order to achieve a better fit of the steady rest against shaft parts that are to be ground and supported and that have different diameters.

It is however necessary in this event for the lateral flanks of the prism to be held in a fixed position and/or locked in an angular configuration tailored to fit a specific supporting task so that the supporting parts are in a fixed position for the supporting task and so that possibly occurring oscillations still do not cause the machining errors to be magnified. The selection of the angular and positional conditions of the supporting pieces at the lateral flanks of the respective sides of the prism of the steady rest arm according to this invention makes it possible for the concentricity on the workpiece to be improved considerably during the grinding process, so that concentricity errors of less than 1 µm or even much less are achievable. However, the steady rest of this invention not only provides for improved concentricity in general, but the steady rest of this invention also provides for a reduction in the size of small ripples for ripples of lower order to be achieved, whereby workpieces of the highest quality can be produced without additional, separate work sequences and/or work processes having to be employed after the grinding operation. The possibility of producing highly exact workpieces without additional production costs leads to considerable decreases in cost. The steady rest of this invention thus represents a technically advantageous and inexpensive solution, which is in particular employed for larger shaft parts having a diameter that is preferably greater than 70 mm and preferably also for crankshafts, with the main shaft diameters possibly also having diameters of less than 70 mm if necessary. The steady rest of this invention is naturally also usable for smaller or medium-sized workpiece dimensions.

Additional concentricity corrections by way of superimposing correcting functions on the x-axis, which are based on measurements and are calculated and implemented by the control equipment of the grinding machine, are already usually used for eccentric bearing points such as pin bearings. It should be understood that such concentricity corrections can also be used for main bearings. Such a concentricity correction can be employed in addition to the use of the steady rest of this invention for purposes of further improving the concentricity.

The steady rest is preferably employed for purposes of supporting a bearing point that has been completely-ground; it is however also possible for the steady rest to be employed on a bearing point just being ground, where, in the latter case, not only support due to the dead weight of the workpiece that is to be ground but also to some extent grinding pressures applied by the grinding wheel are absorbed by the steady rest.

According to a further embodiment of the invention, the prism bearing steady rest arm is movable between the retracted and the supporting position by means of just one actuator acting on a lead screw. This allows the supporting parts, which are located at a fixed angular distance within the prism, to be placed against the bearing point so that the bearing point is supported in a reliable and reproducible way.

The bisector preferably forms an angle toward the vertical such that the resulting forces exerted in grinding caused by the grinding disk press the bearing point into the prism at the supporting parts so that they secure the bearing point. The angle of the bisectors with respect to the perpendicular is selected such that the supporting parts engage at a sub-centered position with respect to the longitudinal axis of the workpiece, so that the grinding forces for all intents and purposes press the workpiece into the prism and against the supporting parts. This causes the workpiece to be firmly held in position in the prism and by the supporting parts.

The steady rest with its CNC infeed axis is also designed so that it can be driven far enough against the supporting bearing point and/or the workpiece to be supported for the support position to correspond to the end position of the infeed, so that the steady rest abuts a fully ground bearing point or a fully ground shaft part. It is however also possible for the supporting position of the steady rest to be a position of the infeed with still existing grinding allowance. This means that, although the final dimension at the bearing point that is still to be ground has not been reached, the steady rest nevertheless touches the just ground bearing point in a supporting way while it is being ground, with the prism, i.e., the steady rest arm with the prism, being tracked to its finished dimension during the grinding operation while the bearing point is simultaneously being ground and supported. It is particularly preferred for the CNC controlled infeed of the prism to take place synchronously with the infeed of the grinding wheel. Because of the implementation in which the infeed axis of the steady rest and the infeed of the grinding wheel are respectively CNC controlled, both axes are individually freely programmable.

In the event the steady rest abuts on a final-ground bearing point, the steady rest can be accurately put into a predetermined position exactly against the workpiece by means of the CNC control axis. The final position then corresponds to the finished dimension of the workpiece that is to be ground. It is in particular possible to reliably support the previously final-/finish-ground bearing points of the steady rest via the displacement of the steady rest, i.e., the steady rest arm with the prism, to the desired final position by means of hydraulic actuation equipment. Such a steady rest is of relatively simple construction and therefore also producible economically.

It is however also preferably possible to use the steady rest as a support at a bearing point which is just being ground, on which a certain grinding allowance therefore is still present. To accomplish this, it is necessary for the steady rest to be exactly tracked according to the grinding allowance existing during the grinding operation, i.e., the difference between the actual grinding allowance and the final dimension. This means that the steady rest must at all times be radially tracked exactly to the grinding allowance that has been ground away per unit of time. This requires synchronization between the CNC axis of the steady rest and the CNC controlled axis of the grinding wheel. This can preferably be accomplished in a particularly simple manner by linearly supplying the supporting prism to the workpiece by means of a CNC controlled movement. With such a linear infeed it is possible to allow the relative infeed rate of the X-infeed axis of the grinding wheel on the one hand and the infeed rate of supporting prism on the other hand to operate synchronously, with the infeed of the steady rest being tracked to the infeed of the grinding wheel i.e., both infeed axis are electronically coupled with one another.

It can be advantageous for reasons of accuracy and based on sensible considerations relating to grinding technology to refrain from an accurate synchronicity between X-infeed axis of the grinding wheel and CNC axis of the steady rest. The supporting prism can for example be temporarily forwarded in a controlled way to the bearing point while it is being ground so that the bearing point that is to be ground is under excess pressure in a predetermined region. Within the context of this invention, the "application of excess pressure" is understood to mean that the bearing point is subject to excess pressure above centers while it is being ground in the range of a few µm to several hundredths of a mm. This can preferably also be accomplished in a manner such that the supporting prisms is temporarily set to apply either an excess pressure that is too high or a pressure that is too low by a certain predetermined amount during the grinding of the bearing point. The degree of application of excess pressure preferably depends on the accuracy achieved with the component being ground as well as on grinding pressures applied onto the workpiece by the grinding wheel. The geometry and the stiffness of the workpiece are additional important influencing factors.

The respective feed motions of the grinding wheel and the steady rest are preferably implemented by means of their respective CNC controlled axes in a manner such that the bearing point is held exactly at centers at all times when it is being ground. It is however preferably also possible to grind slightly below or above the center. The particularly preferred embodiment of the tracking infeed of the steady rest is advantageously used for grinding central bearing points, such as the main bearings of crankshafts.

The steady rest of this invention can also be used for grinding cam shafts or other shaft parts. As is well known, the cams to be ground are located next to the bearing points. This also applies to the pin bearings on crankshafts, if the latter are, for example, ground by the pin chasing grinding process. In that event, the pin or cam bearings are ground in a manner such that, during one grinding revolutions of the workpiece, unequal balances of power due to the grinding process act on the workpiece while it is being ground. A steady rest on which an additional swivel arm located on the prism is provided, which has an additional supporting part at its end region opposite the pivoting axis, is preferably used for such an application. When the supporting parts engage the bearing point in the steady rest of this invention in a sub-centered way, the swivel arm is dimensioned so that the additional part is, as it were, swung from above into the position where it is applied to the bearing point and where additional support of the bearing point from above is provided by way of fixing the swing arm into its application position. In such a case, three supporting parts are provided in the manner of a three-point suspension for the bearing point that is to be ground. This ensures that the bearing point is seated firmly on the supporting prism at all times when it is machined, even if oscillating balances of power act on the steady rest during the grinding process, for example by way of pin chasing or cam grinding.

The pivoting of the swivel arm is preferably accomplished hydraulically, pneumatically or electrically. This ensures that the bearing point that is to be supported always rests exactly upon the supporting prism with a preset, selectable force. At least one pressure sensor is installed for purposes of controlling the pressure in the implementation of hydraulic or pneumatic control of the pivoting motion.

Another preferred embodiment is that the hydraulically or pneumatically controlled swivel arm is pivoted into just one swivel course that is, for example, delimited by a stop. In this case the supporting part is pressed onto the bearing point by way of a pressing force produced by a spring. In the embodiment involving the electrical actuation of the pivoting motion, the swivel arm is pivoted into a pre-determined swiveling position and the pressing force on the bearing point is created by pressing the supporting part against the bearing point by way of a pressing force produced by a spring.

A pre-selected pressing force depending on the respective application position of the swivel arm and thus of the supporting part at the bearing point that is just being ground, final-ground or to be ground can be applied or selected by way of the dimensioning the spring.

A hydraulically or pneumatically actuated component can be used in the same way as in generating the contact pressure by way of a spring component. The dimensioning of the compressive force can be measured and adjusted by way of a pressure sensor.

The engagement position of the additional supporting part lies opposite the points of support of the prism in this case.

The engagement position can be on the bisector of the supporting parts of the supporting prism; but this is not absolutely needed for purposes of technical functionality.

The position of the additional supporting prism is usually not disposed on the bisector of the supporting parts of the supporting prism, since a displacement from this position due to uneven angular distribution prevents out-of-roundness from being reproduced during the grinding of the bearing point.

In accordance with a further embodiment of this invention, the supporting parts are preferably planar, so that a line contact is, at least theoretically, established upon application to the bearing point that is to be supported. The surface of the supporting parts can additionally preferably be configured as a convex curved surface. A surface of the supporting parts that is configured in this way ensures an even better targeted contact between the supporting parts and the surface of respective bearing part that is to be contacted, even in the case of deviations from the cylindrical form of the bearing points. The supporting parts are furthermore preferably given a center groove, which divides the surface of the supporting parts into two supporting sections. This provides for a good supporting effect on the one hand, because support is provided over the entire width of a supporting part. The supporting surfaces are preferably configured to be slightly spherical and their outside edges are chamfered so that the supporting surface is not damaged by way of the latter.

The supporting pieces are preferably provided with CBN or PCD surfaces for reasons of abrasion resistance. This provides for a long service life of the supporting parts, which are nevertheless attached to the forked arms of the prism in a replaceable manner.

A further preferable design of the steady rest is achieved by the fact that the supporting parts are mounted at the sides of the prism so they can pivot freely about an axis running at 90°, i.e., perpendicular to the longitudinal axis of the shaft part that is to be ground (when looking in the direction of the pane extending between the rotational axis of the grinding wheel and the axis of the workpiece). This degree of freedom of the supporting point provided by its ability to pivot freely provides for a more uniform and better application onto the surface of the shaft part, even if the shaft part is to be ground to a slightly spherical or concave shape. A further benefit of this additional pivoting axis of the supporting parts is the fact that, in the case of not entirely cylindrical bearing points, whether due to a grinding error or due to a desired bearing shape, it is possible to prevent the edges of the supporting parts from digging into the surface that is to be supported while they are providing support and from thus leaving undesired grinding marks behind. Without the positioning of the supporting parts so that they can pivot freely at 90° to the longitudinal axis, there would be no line contact for providing support if the shape of the bearing part is not cylindrical, but rather a point contact. This point contact would initiate a higher Hertzian surface stress, which would also lead to damage of the bearing surface that is to be supported. In contrast, the uniform application of the supporting part to the just ground surface of the bearing part that is to be supported provides for greater precision, so that it is possible to attain a high precision of clearly less than 1 µm, regarding roundness in the case of roundness errors.

In accordance with a further aspect of the invention, a grinding machine is disclosed, which serves the purpose of grinding crankshafts and/or eccentric workpiece regions or respectively bearing points on workpieces and/or shaft parts, particularly crankshafts. The grinding machine additionally has a steady rest according to this invention with the characteristics described above. The grinding machine additionally has a control device by means of which the steady rest can be placed against the central region of the workpiece while it is being ground or after it has been ground by means of the grinding wheel and the grinding wheel is operable as needed until the final dimension of bearing point has been reached. Such a grinding machine, which uses the steady rest of this invention, makes it possible to achieve roundness deviations of even less than 1 µm, even if, for example, this involves the grinding of pin bearings of crankshafts or the cams of camshafts in pin chasing processes in which varying forces are transmitted into the component being ground.

The grinding machine of this invention preferably has a measuring device that conveys measuring signals concerning the diameter of the workpiece region to the control equipment for purposes of positioning the steady rest in the region of the workpiece. It is on the basis of these signals that the infeed positions of the steady rest and the grinding wheel are controlled. When the steady rest is placed against a central workpiece region that is just being ground, but that still has an allowance compared with its final dimension, the steady rest can preferably still be made to track according to respective actual grinding allowance of the grinding wheel still under load by the grinding wheel.

It should be understood that the control and measuring device can either be provided in a single unit, or as separate devices, i.e., separate control equipment and a separate measuring device, with the measuring device emitting measuring signals based on the measured values that are fed to the control equipment, so that the control equipment finally implements the synchronous or slightly non-synchronous control of the infeed of the steady rest and the grinding wheel to the respective bearing point that is to be ground in the case where the steady rest is made to track according to a steadily decreasing grinding allowance up to the final dimension of the site that is to be ground. A deviating instance of synchronicity of the infeed can, for example, exist when the component to be ground is to be put under slight excess pressure, e.g., in order to compensate by means of the grinding wheel for grinding forces impinging on the component, so that the result of the grinding operation is thus improved.

In accordance with a further embodiment, the control equipment is configured in such a way that an additional roundness correction is imposable on the CNC-controlled X-axis of the grinding wheel in the manner of a superposition of the infeed values of the grinding wheel through the use of measured values based on the determined roundness errors.

BRIEF DESCRIPTION OF DRAWINGS

Additional embodiments and details of the invention are now described by means of example embodiments as described by the attached drawings, which show.

DETAILED DESCRIPTION OF DRAWINGS

Figure 1:
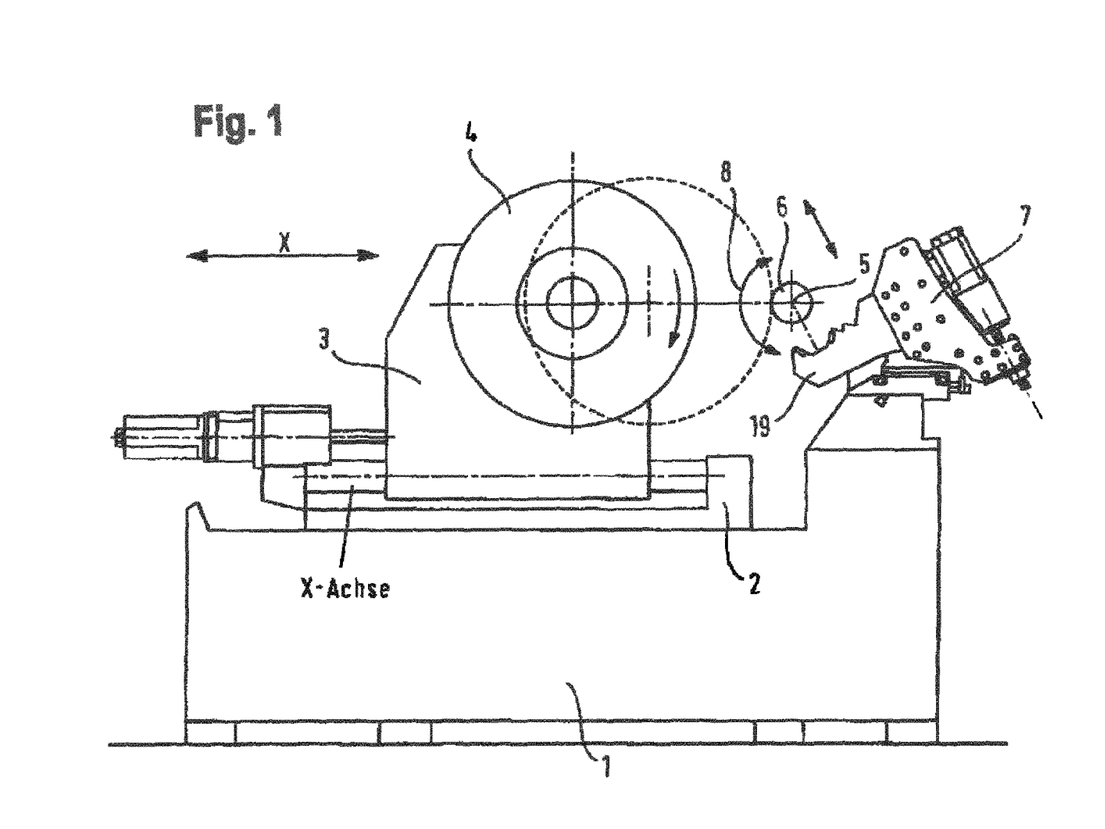
FIG. 1: the basic structure of a grinding machine with a steady rest of this invention.

FIG. 1 shows a side view of the basic structure of a grinding machine provided with a steady rest of this invention. A machine bed 1 carries a compound slide for a CNC-controlled movement of a grinding wheel 4 mounted on a wheel head 3 for purposes of advancing the grinding wheel toward the workpiece 6 that is to be ground and that has a longitudinal axis 5. The wheel head 3 is realized in a manner known per se in the form of a compound slide, whereby it is possible to displace the wheel head 3 along with the grinding wheel 4 along the central longitudinal axis of the workpiece, i.e., its rotational axis, and at a right angle to the central longitudinal axis of the workpiece. The workpiece 5 is held on a workpiece headstock (not shown), wherein the grinding wheel 4 is movable along a CNC-controlled Z-axis relative to the central longitudinal axis of the workpiece 5. The workpiece headstock (not shown) is mounted in the front region of the grinding machine on the machine bed on a grinding table, which also holds the rotation drive for the workpiece, a tailstock and a steady rest 7 for supporting the workpiece at a bearing point. The bearing point that has just been ground is preferably supported. It is however also possible to support a bearing point that has already been ground. The workpiece drive unit (not shown) symbolically represented by a double-pointed arrow 8 is also CNC-controlled and is called the C-axis.

Figure 2:
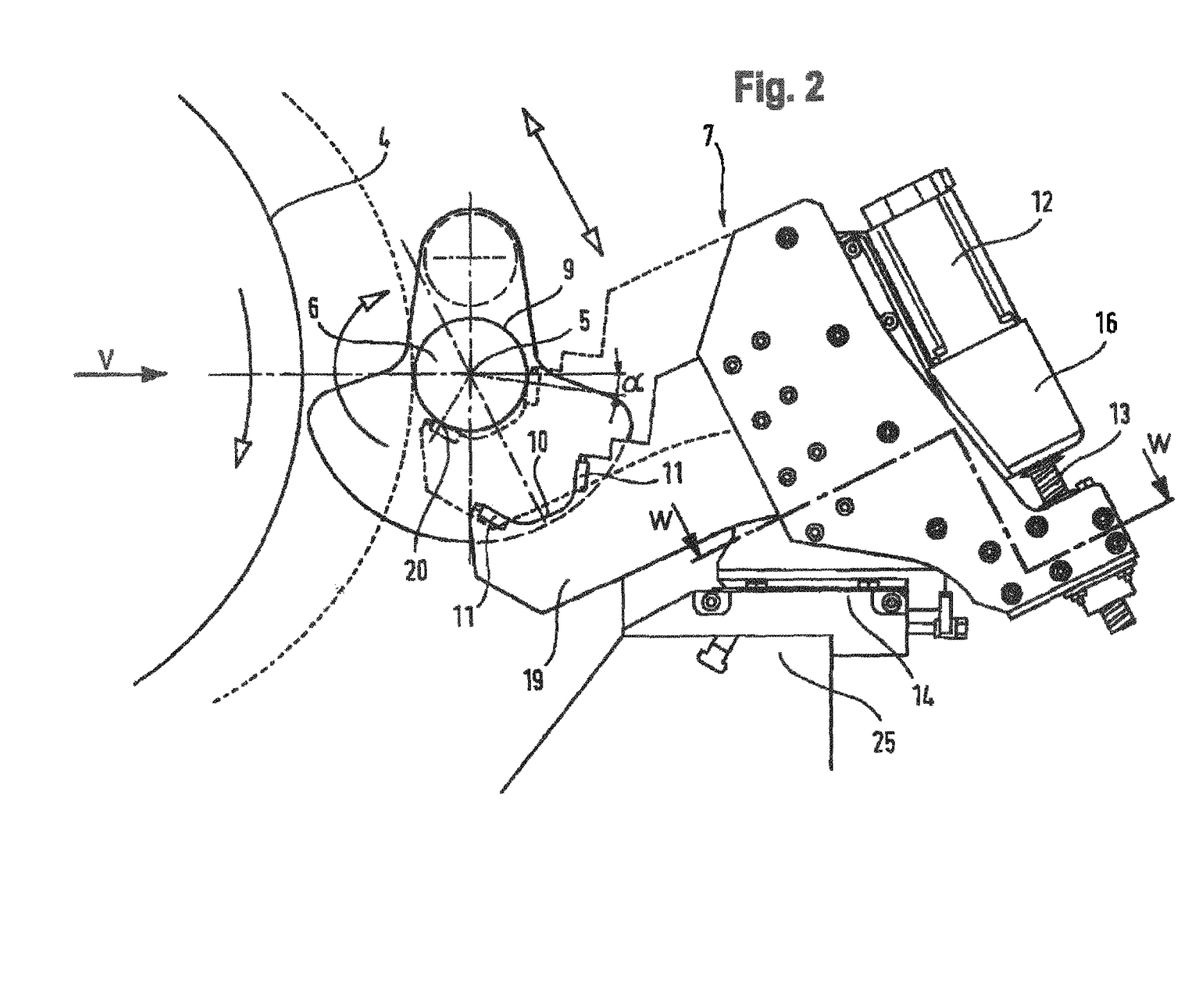
FIG. 2: a magnified detail of a just ground crankshaft with the steady rest of this invention in the retracted and the supporting position.

FIG. 2 shows a detailed view of the grinding machine in accordance with FIG. 1, in which a grinding wheel 4 just engaging a workpiece 6 in the form of a main bearing of a crankshaft is in the process of grinding. The central longitudinal axis of the main bearing pin extends parallel to the rotational axis of the grinding wheel 4. The steady rest 7 is attached on to the grinder table 25. The steady rest 7 has a recess formed on a steady rest arm, which is in the form of a prism and exhibits supporting parts 11 at its lateral flanks 22. The steady rest 7 is disposed on the grinder table 25 in a manner such that the supporting lines 20 (with their right supporting part 7 shown in the figure) formed at the contact with the bearing point and located at about 7° below the center of the workpiece. This means that the supporting prism is as a whole disposed sub-centrically with respect to the longitudinal axis of the workpiece and the rotational axis of the grinding wheel, which lie in a plane.

In FIG. 2 the supporting position of the steady rest is represented by broken lines, whereas the retracted position, in which the workpiece can for example be removed and/or remounted, is represented by means of solid lines. The angle α of about 7° proved to be particularly advantageous for grinding, since the bearing point 9 that is to be supported is never exactly 100% circular. By means of this sub-centric positioning of the direct support of the bearing point 9 that is to be ground, the roundness errors at the bearing point are not continually reproduced at the bearing point that is to be ground while it is being ground, as is the case in the prior art, when the support of the bearing point lies in the same plane as the one formed by rotational axis of the grinding wheel and the longitudinal axis 5 of the workpiece with respect to the bisector between the two supporting parts.

In the case of the present example embodiment, FIG. 2 shows that the bisector between the supporting parts 11 of the prism 10 of the steady rest 7 extends along the longitudinal axis 5 of the workpiece, i.e., clearly outside of the plane formed by the longitudinal axis of the workpiece and the rotation axis of the grinding wheel. The angle of the bisector between the supporting parts by means of which the bearing point is sub-centrally supported by the adjacent prism 20 is about 67° in this embodiment. This 67° angle of the bisector depends on the respective grinding task and the respective grinding conditions and can be optimized by means of simple experiments. It has surprisingly been found that bearing points with roundness errors that are in part smaller than 1 μm can be ground with this arrangement of the prism. These small roundness errors are, among other things, also attainable because the steady rest is highly rigid on the one hand and has the advantage of a moving on a CNC-controlled infeed axis on the other hand. It is because of this that the steady rest arm along with the supporting prism and the actual supporting parts can be advanced to the bearing point 9 that is to be supported under defined conditions along a defined path. The infeed of the steady rest to the bearing point that is to be supported implemented exactly along the bisector by means of a threaded spindle 13 ensures that the center of the bearing point is held in a defined position with respect to the infeed axis of the grinding wheel. The displacement of the supporting prism along the CNC-controlled axis on the bisector is ensured by means of a servo actuator 12, which operates via a coupling 17 disposed in a housing 16 acting on the threaded spindle 13, preferably in the form of a ball screw, forwarding the supporting prism 10 from its retracted position to its supporting position. The steady rest is attached on to the grinder table 25 by means of a bracket, which has a dovetail guide 14.

The downward directed arrow shown in the grinding wheel 4 indicates the rotational direction of the grinding wheel. The upward directed arrow pointing to the workpiece indicates the rotation of the workpiece. The double-pointed arrow shown at the top of the figure indicates the CNC-controlled infeed axis of the steady rest from the retracted to the supporting position and back. The rotational direction of the grinding wheel and/or the workpiece can however be reversed.

The supporting parts 11 are configured as CBN- or PCD-coated plates, which are in direct contact with the bearing point 9 of the workpiece 6 in the supporting position of the steady rest. This means that the bearing point 9 of the workpiece 6 slides on these supporting parts 11 in theoretical linear contact in the form of the supporting lines 20. Supporting parts coated with CBN (cubic boron nitride) or PCD (polycrystalline diamond) are used depending on the raw material or the grinding conditions. The advantage of these materials is that they have a high abrasion resistance.

Figure 3:
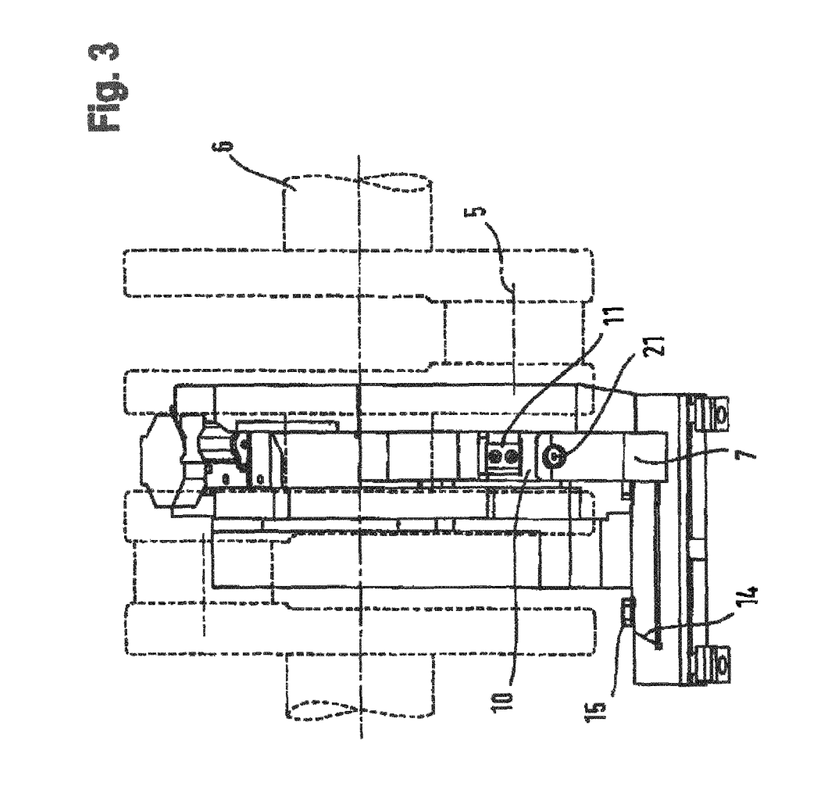
FIG. 3: a general front view on the steady rest of this invention in the direction of the arrow V of FIG. 2.

FIG. 3 shows a front view of the steady rest of this invention along the line of sight of the directional arrow shown in FIG. 2 and identified with a V. The lower bracket for connecting the steady rest with the grinder table 25 has a dovetail guide 14. The guide is held in a defined place by means of locking screws 15. By means of this rigid positioning providing for a displacement along a predefined path, the steady rest 7 with its supporting prism 10 is configured so that it is positioned toward the center of the bearing point 9 that is to be supported. This means that the two supporting parts 11 rest simultaneously and uniformly against the workpiece 6 and that the infeed of the steady rest from the retracted position to the supporting position takes place along the bisector between the two supporting parts of the prism. This so-called centering must be performed once and is held in a fixed place after an alignment.

This drawing shows a front view of the supporting parts 11. It is evident that the supporting parts are fastened to the lateral flanks of the prism by means of two screws and are configured as a continuous supporting plate. The pivoting axis 21 of the additional supporting part at the prism 10 is (also see the description of the FIGS. 6B to 6C) also shown.

Figure 4:
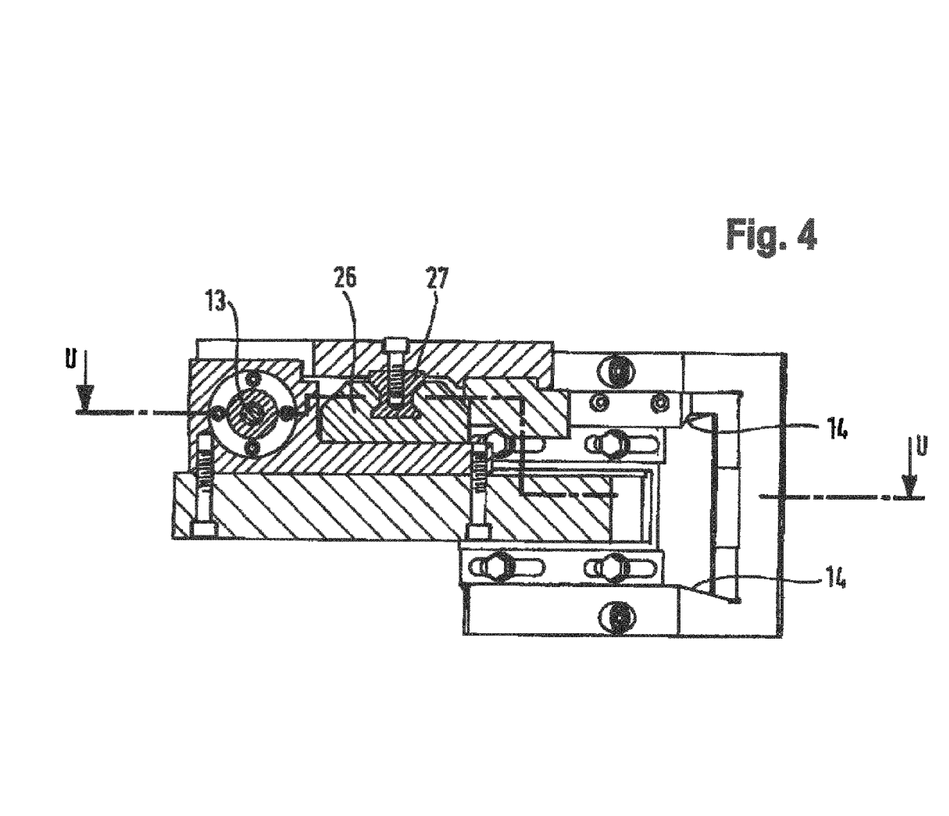
FIG. 4: a sectional view of the steady rest arm to depict the guidance for linear motion of the supporting prism along the cutting plane W-W.

FIG. 4 shows a sectional view along the cutting plane W-W shown in FIG. 2. The guide for the linear displacement of the supporting prism is shown. The guidance takes place along a guide rail 27, which is held in a guide carriage 26. The actuation is accomplished by way of the threaded spindle 13. Play-free prestressed ball- or roller bearing units are placed on the guide rail 27. The position of the threaded spindle 13 near the guide rail 27 is shown.

Figure 5:
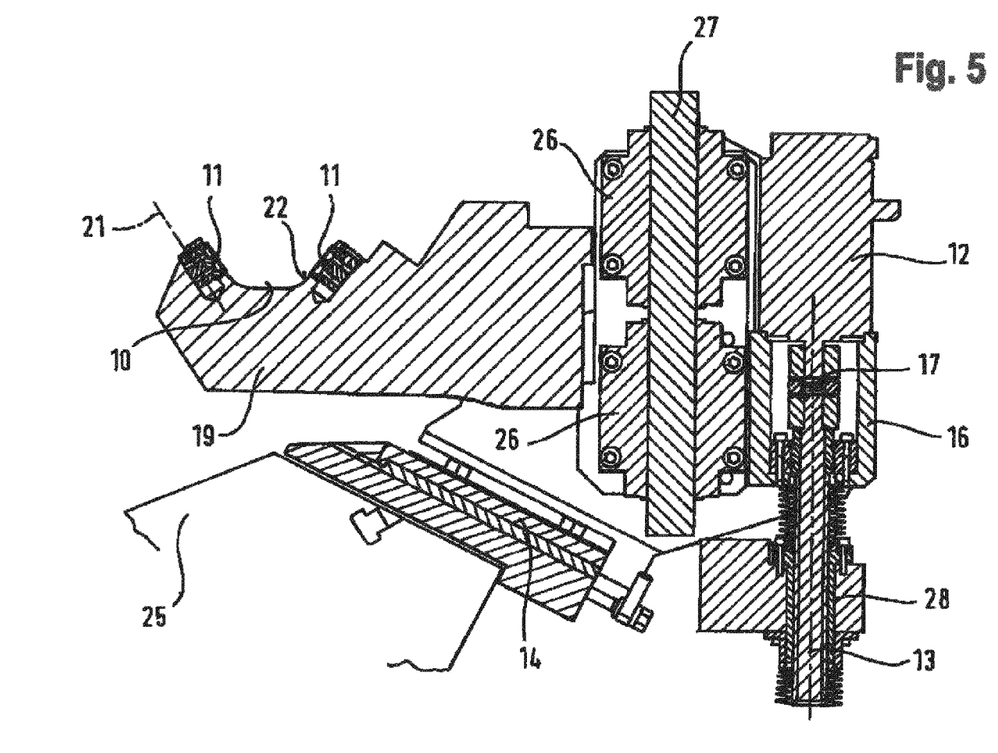
FIG. 5: a sectional view through the steady rest of this invention along the cutting plane U-U according to FIG. 4.

FIG. 5 shows a sectional view through the steady rest of this invention, in which the guide rail 27 and the guide carriage 26 are shown. The drive by means of the CNC-controlled servomotor 12, for placing the supporting prism 10 next to the bearing point that is to be supported, is also shown. The propulsion for displacing the supporting prism along the bisector between the supporting parts 11 makes use of the threaded spindle 13, which is at least partly held in the housing 16. The housing 16 contains a coupling 17 by means of which the servomotor 12 is coupled to the threaded spindle 13. The infeed motion of the supporting prism 10 under control of the grinding machine takes place at the highest possible precision by means of the on-demand programming of the CNC-controlled actuator 12. The threaded spindle 13 is additionally held by means of a threaded nut 28.

The steady rest is held on the grinder table 25 by means of the mounting, whose dovetail guide 14 is shown in a sectional view in the drawing. The steady rest arm 19 has the prism 10, at whose lateral flanks the supporting parts 11 are disposed, at its front end. The drawing also shows that the supporting parts 11 are attached so they can pivot freely about the pivoting axis 21. The pivoting axis of the respective supporting parts extends at 90°, i.e., perpendicularly to the central longitudinal axis of the workpiece that is to be supported, as seen from the side, i.e., as seen from the direction of the grinding wheel, which is not shown in FIG. 5. The partial sectional view corresponds to a cutting plane U-U in accordance with FIG. 4.

Figure 6A:
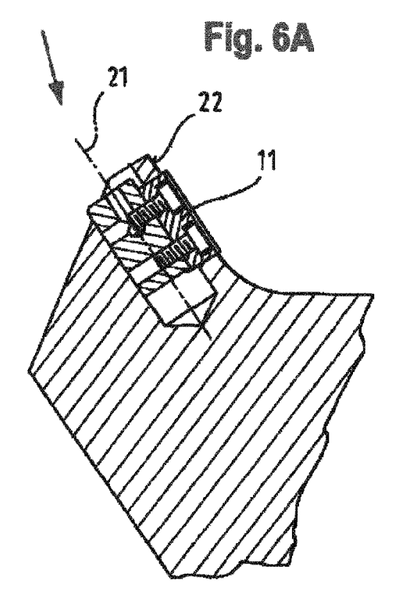
FIG. 6A: a sectional view of a supporting part in the supporting prism of the steady rest with the supporting part capable of swiveling about a swivel axis at 90° to the longitudinal axis of the shaft part that is to be supported.

FIG. 6A shows a magnified representation of a sectional view of a supporting part 11 disposed on a lateral flank. It is evident that the supporting parts 11 extend over the surface of the lateral flanks 22 toward the inside of the prism, so that the supporting parts can ensure the relevant supporting contact on placement at the workpiece that is to be supported and possibly about to be ground. The supporting part 11 is detachably fastened on a pivot pin, which allows for the pivoting motion of the supporting part about the swivel axle or respectively the swivel axis 21. The advantage of such a pivoting accommodation of the supporting parts is that accidentally or intentionally not exactly cylindrical bearing points that are to be ground assure a steadily constant, reliable and well defined contact of the supporting part with the bearing point that is to be supported, i.e., with its surface. This pivoting mounting of the supporting part at least prevents one or more edges of the supporting part from, as it were, digging into the surface of the workpiece that is to be supported if the bearing surface to be supported deviates from an exact cylindrical shape. The supporting part shown has two supporting regions, which are disposed at the sides of the lamellar supporting part and are separated from each other by way of a so-called center groove 23. The advantage of such a design is that the center groove creates two supporting regions for every supporting part, which regions warrant reliable support, but also provide for a brief line contact, so that the effects of the engagement of the steady rest onto an already ground region of a bearing point are decreased even more.

Figure 6B:
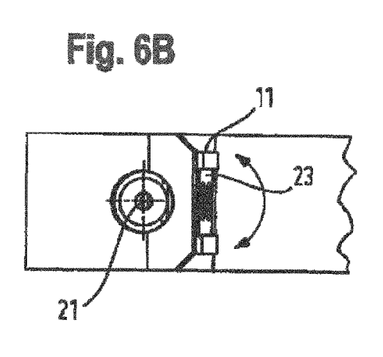
FIG. 6B: a top view of a supporting part disposed on the prism of the steady rest.

FIG. 6B shows such an embodiment of the supporting part in a top view along the arrow shown in FIG. 6A. The double-pointed arrow shown in FIG. 6B indicates the ability of the supporting part 11 to pivot about the pivoting axis 21.

Figure 6C:
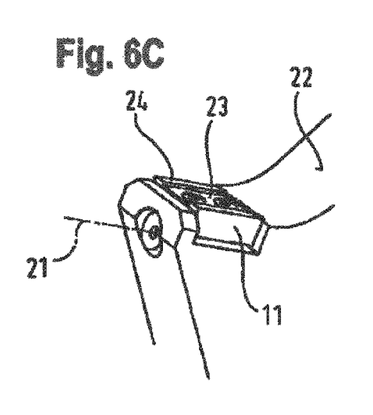
FIG. 6C: a perspective drawing of a supporting part with a center groove and capable of pivoting in accordance with FIGS. 6A and/or 6B.

And lastly FIG. 6C shows such a pivoting supporting part 11 in perspective view. The center groove 23 forms a supporting section on both sides of the supporting part 11. The angular displacement, i.e., pivoting of the supporting part 11 occurs about the pivoting axis 21. A part of the lateral flank 22 of the prism is also indicated.

The design such that each supporting part comprises two supports forming the supporting lines 20 and additionally being supported in a pivoting way, the supporting parts fit absolutely uniformly onto the surface of the workpiece that is to be supported, i.e., to the surface of the bearing point 9, as per this design, even if the bearing point has defects in shape as regards cylindricity or a certain (intentional) conicity. It is furthermore advantageous that the bearing point 9 rests more stably against the prism without the occurrence of a so-called over-determined support. By means of such a design, the bearing point that is to be supported is installed absolutely uniformly at all four installation points and/or short supporting lines 20. It is by this means that an optimized support of the workpiece by the steady rest is achieved.

Figure 7:
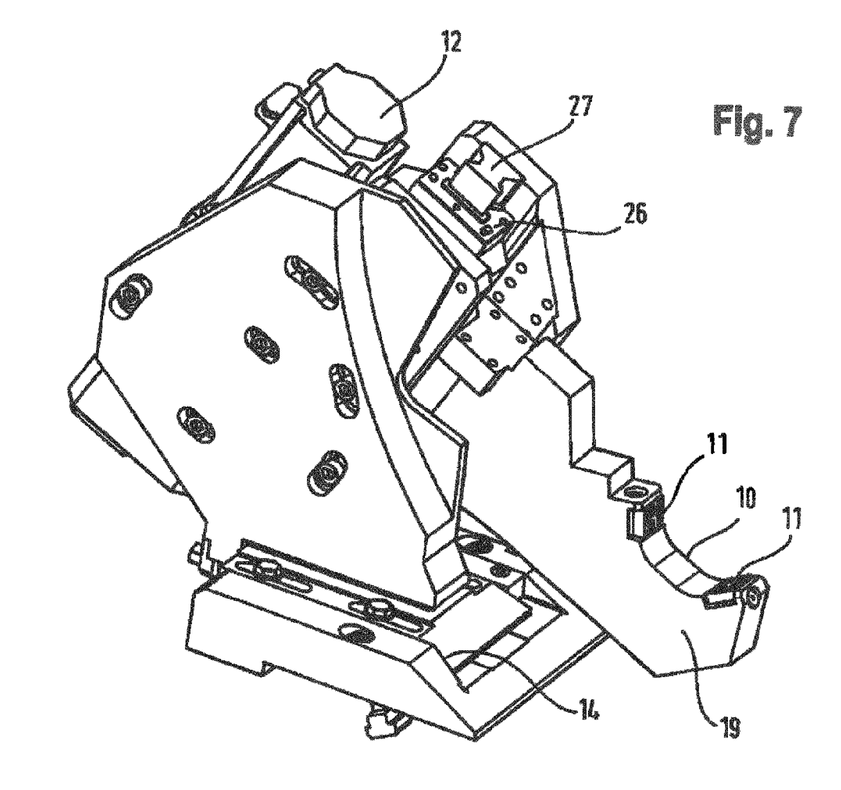
FIG. 7: a perspective drawing of the steady rest of this invention with supporting parts in accordance with FIGS. 6A and/or 6B.

FIG. 7 shows a steady rest of this invention in a perspective way as a complete structural unit. The steady rest arm 19, the prism 10, the pivotingly supported supporting parts 11, the guide carriages 26 with the guide rail 27, the CNC-controlled actuator 12 as well as the bracket for fastening to the grinder table with the dovetail guide 14 are shown. This steady rest of this invention is very compact and decidedly high quality grinding results can be achieved by means of this design.

Figure 8:
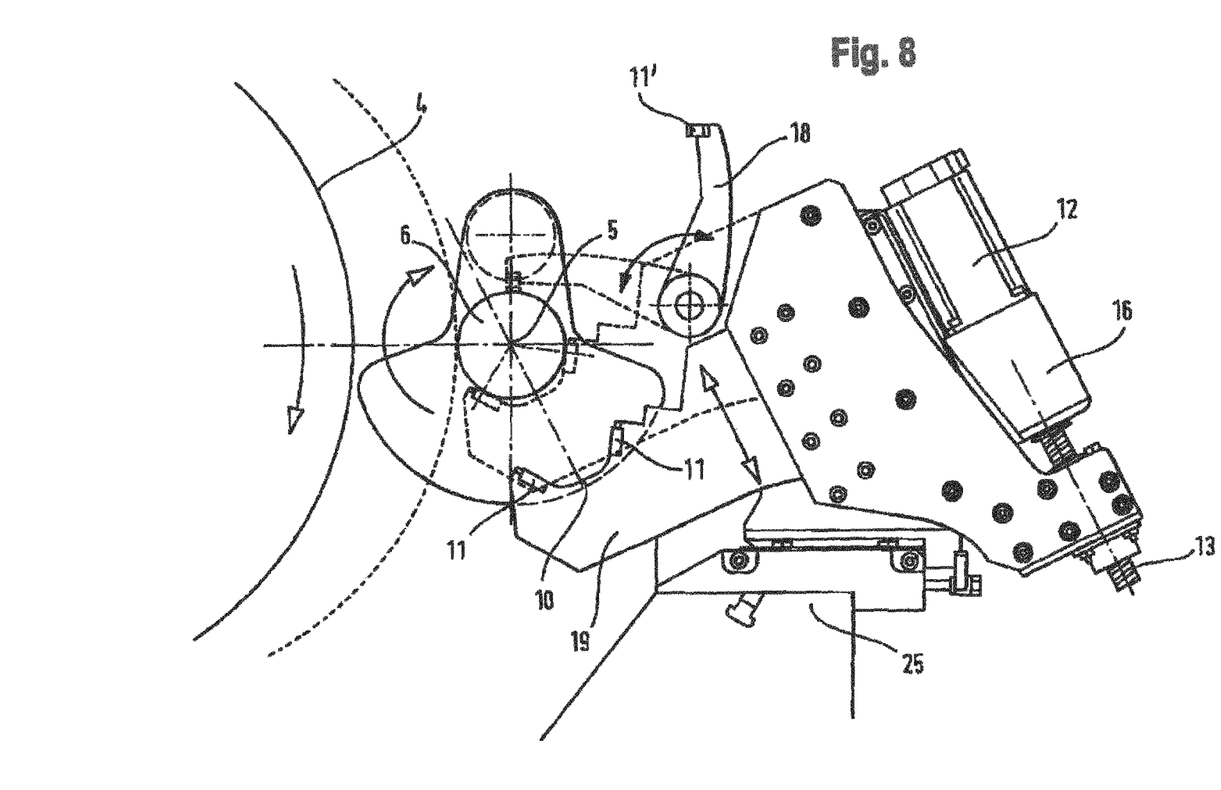
FIG. 8: a detailed side view in accordance with FIG. 2, but for an additional embodiment with an additional pivoting lever on the steady rest of this invention, to which a third supporting part is attached.

FIG. 8 shows an additional embodiment of the steady rest of this invention. The view shown in FIG. 8 corresponds to the partial side view in accordance with FIG. 2, with the difference that, according to this embodiment, an additional pivoting lever 18 with an additional supporting part 11' is installed on the steady rest. This design of the steady rest is particularly needed and practical if different grinding forces act on the workpiece during the grinding at the workpiece that is to be ground. This is for example the case in pin chasing or in grinding non-cylindrical components, such as cams. A so-called three-point supporting effect is achieved through the application of the lever 18 by means of the additional third supporting part 11'. This allows a stabilized support, achieved by means of the support of the workpiece by the steady rest that is to be ground.

In this embodiment, the pivoting lever 18 is pivoted either pneumatically or hydraulically from above onto the surface of the bearing point that is to be supported, so that the workpiece always rests accurately upon the supporting prism with a predetermined force. The force with which the pressure is applied can then be expediently regulated and/or controlled by way of the respective pressures of the of the pneumatic or hydraulic actuators for the pivoting lever 18. The respective applied pressures can then be adapted exactly to the grinding process and even controlled during the grinding process so as to conform to this process. An electrical actuation of the pivoting lever 18, wherein the desired contact pressure can be applied to the supporting part 11 by means of a spring or a hydraulic or pneumatic component, is also conceivable.

The invention claimed is:

1. Steady rest for—under operating conditions—supporting central workpiece regions of a workpiece during machining of central and/or eccentric workpiece regions, which is brought to the workpiece from a retracted to a supporting position so as to grind the workpiece, the steady rest comprising:
at least two supporting parts that can be advanced to the workpiece region at respectively separated peripheral regions, with the workpiece along with its workpiece region being held in the supporting position,
characterized in that the supporting parts are disposed so as to form an opening angle with respect to each other at each lateral flank of a body that opens in a fork-like manner at a steady rest arm, in a fixed position with respect to one another and with respect to the steady rest arm and in supporting position sub-centric to a longitudinal axis of the workpiece region, that a bisector comprising a bisector line and formed between both supporting parts manifests a fixed acute angle with respect to the perpendicular running through the longitudinal axis of the workpiece region and that a CNC-controlled infeed to the workpiece region takes place coincident with this bisector line.

2. Steady rest according to claim 1, wherein the steady rest arm is movable between the retracted and the supporting position by means of just one actuator operating on a screw spindle.

3. Steady rest according to claim 1, further comprising a swivel lever which provides a lever supporting part opposite a swivel axis at its end region, by means of which supporting part the workpiece region is additionally supportable when the swivel lever is swung into its supporting position in the workpiece region and can be pressed against the workpiece region.

4. Steady rest according to claim 3, wherein the swivel lever is swung by hydraulic, pneumatic or electrical means.

5. Steady rest according to claim 3, wherein in its supporting position the swivel lever applies a contact force of an additional supporting piece generated by a spring to the workpiece region.

6. Steady rest according to claim 1, wherein the supporting parts have surfaces that are planar, convexly curved or divided by means of a center groove into at least two supporting sections.

7. Steady rest according to claim 1, wherein the supporting parts have CBN or PCD-coated surfaces.

8. Steady rest according to claim 1, wherein the supporting parts are installed on the lateral flanks of the body so that they can pivot freely about an axis at right angles to the longitudinal axis of the workpiece region.

9. Steady rest according to claim 1, wherein the bisector line always passes through the longitudinal axis of the workplace region.

10. Steady rest according to claim 1, wherein the body comprises a prism-shaped opening.

11. Grinding machine for grinding central and/or eccentric workpiece regions on workpieces comprising:
a steady rest for supporting the central workpiece regions, which steady rest can be advanced to the workpiece region from a retracted to a supporting position for grinding the workpiece and has at least two supporting parts that can be forwarded to a workpiece region, which supports the workpiece region at respective circumferential regions that are separated from each other, with the workpiece along with its workpiece region being supported in the supporting position, and
a control device by means of which the steady rest can be forwarded to the central workpiece region during or after the grinding of a workpiece region by means of a grinding wheel and the grinding wheel can be forwarded up to the final dimension of the bearing point, characterized in that the supporting parts of the steady rest forming an opening angle with respect to each other at each lateral flank of a body forming a fork and having two shanks are disposed in the grinding machine in a fixed position with respect to each other on a steady rest arm and in the supporting position sub-central to a longitudinal axis of the workpiece region, that a bisector comprising a bisector line and formed between the supporting parts has a fixed acute angle with respect to the perpendicular to the longitudinal axis of the workpiece region and that the steady rest has formed a CNC feed axis by means of which it can be forwarded coincident with the bisector line to the workpiece region in a CNC-controlled manner.

12. Grinding machine according to claim 11, with a steady rest disposed therein in a manner such that the bisector is at an angle with respect to the perpendicular such that the forces applied during the grinding press the workpiece region onto the supporting parts on the body so that its position is fixed.

13. Grinding machine according to claim 11, in which the steady rest is configured so that the supporting position is a final position of an infeed and the body in its final position lies against a finish-ground bearing point.

14. Grinding machine according to claim 11, wherein the steady rest is configured so that the supporting position is a position for infeeding in the event of a still existing grinding dimension and wherein the body and the supporting parts follow up to a final dimension while supporting the bearing point.

15. Grinding machine according to claim 11, wherein the CNC-controlled infeed of the body of the steady rest can be accomplished in synchrony with an infeed of the grinding wheel.

16. Grinding machine according to claim 11, further comprising a measuring device, which transmits measurement signals about the diameter of the workpiece region concerning a feed position of the steady rest and concerning an X-axis position of the grinding wheel to the control device, on the basis of which the feed position of the steady rest and a feed position of the grinding wheel are controlled.

17. Grinding machine according to claim 11, in which the steady rest can track an X-axis position of the grinding wheel by means of control equipment.

18. Grinding machine according to claim 11, with which an additional concentricity correction of feed values of the grinding wheel can be impressed on a CNC-controlled X-axis of the grinding machine by means of the control device.

19. Grinding machine according to claim 11, wherein the bisector line always passes through the longitudinal axis of the workplace region.

20. Grinding machine according to claim 11, wherein the body comprises a prism-shaped opening.

21. Steady rest according to claim 1, wherein the central workpiece regions comprise bearing points on shaft parts.

22. Steady rest according to claim 21, wherein the bearing points on shaft parts comprise bearing points on crankshafts.

23. Grinding machine according to claim 11, wherein the central workpiece regions comprise bearing points on crankshafts.

* * * * *